United States Patent [19]
Kress

[11] Patent Number: 5,405,105
[45] Date of Patent: Apr. 11, 1995

[54] TILT WING VTOL AIRCRAFT

[75] Inventor: Robert W. Kress, Saugerties, N.Y.

[73] Assignee: Hudson Valley V/STOL Aircraft, Inc., Saugerties, N.Y.

[21] Appl. No.: 68,156

[22] Filed: May 28, 1993

[51] Int. Cl.$^6$ .............................................. B64C 27/28
[52] U.S. Cl. ...................................... 244/7 C; 244/56; 244/12.4; 244/66
[58] Field of Search .................. 244/7 C, 7 R, 12.4, 244/56, 66, 7 B

[56] References Cited

U.S. PATENT DOCUMENTS

| | | | |
|---|---|---|---|
| 3,107,882 | 10/1963 | Matteson et al. | 244/7 C |
| 3,136,499 | 6/1964 | Kessler | 244/7 C |
| 3,179,352 | 4/1965 | Nelson | 244/7 C |
| 3,197,157 | 7/1965 | King | 244/7 C |
| 3,666,209 | 5/1972 | Taylor | 244/7 C |
| 5,096,140 | 3/1992 | Dornier, Jr. et al. | 244/7 C |

FOREIGN PATENT DOCUMENTS

| | | | |
|---|---|---|---|
| 1003940 | 9/1965 | United Kingdom | 244/7 C |
| 1127102 | 4/1972 | United Kingdom | 244/7 C |

*Primary Examiner*—Michael S. Huppert
*Assistant Examiner*—Anne E. Bidwell
*Attorney, Agent, or Firm*—Daniel J. Tick; Sandra M. Kotin

[57] ABSTRACT

A tilt wing VTOL aircraft has a fuselage with sides and an upper surface, an upper wing having a leading edge, a trailing edge, a chord, a lower surface and an upper surface. The wing is pivotally mounted on the fuselage for rotation from a cruise flight position in which the upper surface of the wing is flush with the upper surface of the fuselage to a hover position in which the wing is perpendicular to the upper surface of the fuselage. Aircraft engines are mounted on the wing. The aircraft has a pair of flaps at the trailing edge of the wing, each located between the fuselage and an engine and each spaced the same distance from the fuselage and each of the engines. The flaps are mounted for selective movement from colinearity with the chord of the wing to a first angle of about $+30°$ with the chord and about $30°$ with the upper surface of the wing and to a second angle of about $-30°$ with the chord and about $30°$ with the lower surface of the wing. When the flaps are between a small angle with the chord and the first angle with the chord, the aircraft moves in a forward horizontal direction while in hover and when the flaps are between a small angle with the chord and at the second angle with the chord, the aircraft moves in a reverse horizontal direction while in hover. The horizontal motion forces are produced by the propeller slipstream acting on the wing flaps and because the flap aerodynmnic center of gravity is at essentially the same height as the aircraft center of gravity.

12 Claims, 2 Drawing Sheets

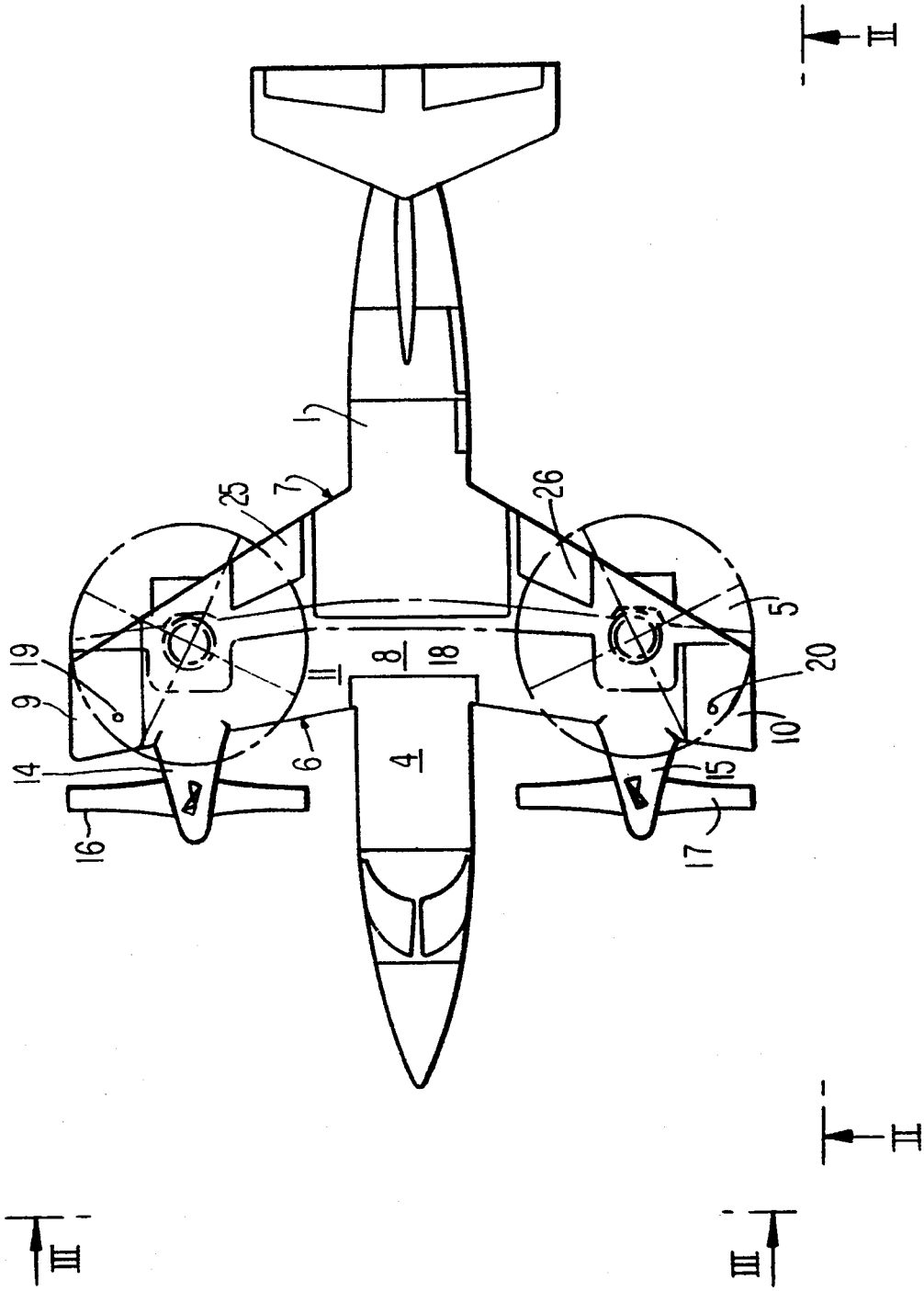

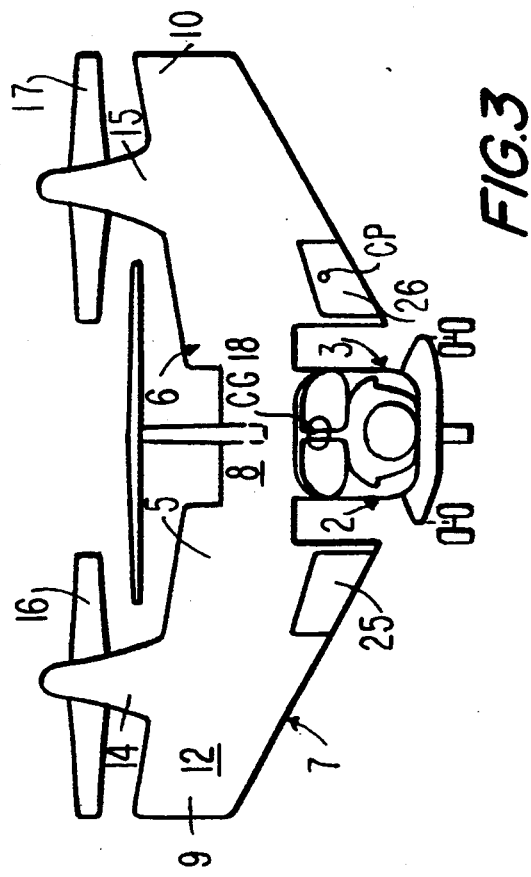

TILT WING VTOL AIRCRAFT

BACKGROUND OF THE INVENTION

The present invention relates to a tilt wing VTOL aircraft. More particularly, the invention relates to a direct horizontal motion control for selectively moving a tilt wing VTOL aircraft in forward and reverse directions when its wing is in the hover position. No aircraft pitch motion is required to produce fore and aft motion.

Known VTOL aircraft and particularly tilt wing VTOL aircraft are unable to move in forward or reverse directions while their wing is in the hover position, unless they change pitch angle. The requirement of known VTOL aircraft to pitch before translation occurs due to rotation of the thrust vector which introduces a lag in vehicular planar motion response in the most important fore and aft directions.

The principal object of the present invention is to provide a tilt wing VTOL aircraft which is able to move horizontally in forward and reverse directions while its wing is in the hover position, without pitch motion being required.

An object of the invention is to provide a tilt wing VTOL aircraft which functions efficiently, effectively and reliably to selectively provide forward and reverse horizontal motion while its wing is in the hover position, without pitch motion being required.

Another object of the invention is to provide a VTOL aircraft having a direct horizontal motion control of simple structure for selectively horizontally moving the aircraft in forward and reverse directions when it is in hover, without pitch motion being required.

Still another object of the invention is to provide a VTOL aircraft having a direct horizontal motion control which is inexpensive in manufacture for selectively horizontally moving the aircraft in forward and reverse directions when it is in hover.

Yet another object of the invention is to provide a VTOL aircraft having a direct horizontal motion control which is installable on a VTOL aircraft with facility, convenience and rapidity and which selectively horizontally moves the aircraft in forward and reverse directions when it is in hover.

Another object of the invention is to provide a VTOL aircraft having a direct horizontal motion control which functions efficiently, effectively and reliably to selectively horizontally move the aircraft in forward and reverse directions when it is in hover.

Still another object of the invention is to provide a VTOL aircraft having a direct horizontal motion control which is able to selectively accelerate the aircraft in forward and reverse directions up to a magnitude of essentially ±0.1 G when the aircraft is in hover.

Yet another object of the invention is to provide a tilt wing VTOL aircraft which is able to accelerate in forward and reverse directions up to a magnitude of essentially ±0.1 G when the wing of the aircraft is in a hover position.

Another object of the invention is to provide a VTOL aircraft which is able to be controlled to move horizontally in forward and reverse directions when the wing of the aircraft is in a hover position much more quickly than known similar aircraft.

BRIEF SUMMARY OF THE INVENTION

A tilt wing VTOL aircraft has a fuselage with sides and an upper surface, an upper wing having a leading edge, a trailing edge, a chord, a lower surface and an upper surface. The wing is pivotally mounted on the fuselage for rotation from a cruise flight position in which the upper surface of the wing is substantially flush with the upper surface of the fuselage to a hover position in which the wing is substantially perpendicular to the upper surface of the fuselage. Aircraft engines are mounted on the wing and extend forward of the leading edge of the wing. In accordance with the invention, direct horizontal motion control means on the wing selectively move the aircraft in forward and reverse directions when the wing is in the hover position.

The direct horizontal motion control of the invention is much quicker than pitch control and results in much better hovering maneuverability. The direct horizontal motion control of the invention functions as stated herein because the flap aerodynamic center of pressure is at essentially the same height as the center of gravity of the aircraft. The horizontal motion threes are produced by the propeller slipstream acting on the wing flaps.

The direct horizontal motion control means is at the trailing edge of the wing and comprises a pair of spaced flaps at the trailing edge of the wing equidistantly spaced from the fuselage. The flaps are located between the fuselage and the aircraft engines and each of the flaps is positioned the same distance from the engine closest to it and the same distance from the engine farthest from it.

Each of the flaps is mounted for selective movement from substantial colinearity with the chord of the wing to a first angle with the chord and the upper surface of the wing and to a second angle, substantially equal to the first angle, with the chord and the lower surface of the wing. The first angle is substantially +30° with the chord and substantially 30° with the upper surface of the wing and the second angle is substantially −30° with the chord and substantially 30° with the lower surface of the wing.

When the flaps are positioned between a substantially small angle with the chord and the first angle with the chord, the aircraft moves in a forward direction while in hover and when the flaps are positioned between a substantially small angle with the chord and the second angle with the chord, the aircraft moves in a reverse direction while in hover. Acceleration of the aircraft in forward or reverse direction while in hover reaches a magnitude of substantially ±0.1 G.

In accordance with the invention, the tilt wing VTOL aircraft comprises a pair of flaps at the trailing edge of the wing, each located between the fuselage and an engine and each spaced substantially the same distance from the fuselage and each of the engines. The flaps am mounted for selective movement from substantial colinearity with the chord of the wing to a first angle of substantially +30° with the chord and substantially 30° with the upper surface of the wing and to a second angle of substantially −30° with the chord and substantially 30° with the lower surface of the wing. Thus, when the flaps are between a substantially small angle with the chord and the first angle with chord, said aircraft moves in a forward direction while in hover and when the flaps are between a substantially small angle with the chord and the second angle with the chord, said aircraft moves in a reverse direction while in hover.

The aircraft preferably has at least two engines which drive propellers.

In accordance with the invention, a method of selectively moving a tilt wing VTOL aircraft in forward and reverse directions when the aircraft is in hover, comprises the step of mounting flaps at the trailing edge of the wing for selective movement from substantial colinearity with the chord of the wing to a first angle with the chord and the upper surface of the wing and to a second angle, substantially equal to the first angle, with the chord and the lower surface of the wing. Thus, when the flaps are positioned between a substantially small angle with the chord and the first angle with the chord, the aircraft moves in a forward direction while in hover and when the flaps are positioned between a substantially small angle with the chord and the second angle with the chord, the aircraft moves in a reverse direction while in hover.

BRIEF DESCRIPTION OF THE DRAWINGS

In order that the invention may be readily carried into effect, it will now be described with reference to the accompanying drawings, wherein:

FIG. 1 is a top plan view of an embodiment of the tilt wing VTOL aircraft of the invention;

FIG. 2 is a side view of the embodiment of FIG. 2, taken along the lines II—II, of FIG. 1;

FIG. 3 is a front view of the embodiment of FIG. 2, taken along the lines III—III, of FIG. 1; and FIG. 4 is a schematic diagram, on an enlarged scale, illustrating a flap of the invention.

DETAILED DESCRIPTION OF PREFERRED EMBODIMENT

The tilt wing VTOL (Vertical Takeoff and Landing) aircraft of the invention, shown in FIGS. 1, 2 and 3 has a fuselage 1 having sides 2 and 3 and an upper surface 4. The aircraft has a wing 5 having a leading edge 6, a trailing edge 7, an inboard area 8 adjacent the upper surface 4 of the fuselage 1, spaced opposite end tip areas 9 and 10, an upper surface 11 and a lower surface 12. The wing 5 is pivotally mounted on the fuselage 1 by any known suitable means for rotation from a forward, or cruise, flight position in which the upper suffice 11 of said wing is substantially flush with the upper surface 4 of said fuselage, shown in solid lines in FIG. 1 and in broken lines in FIGS. 2 and 3, to a hover, or substantially vertical, flight position in which said wing is substantially perpendicular to said upper surface of said fuselage, shown in broken lines in FIG. 1 and in solid lines in FIGS. 2 and 3.

Aircraft engine and propeller assemblies 14 and 15 of any suitable known type are mounted on the wing 5 and extend forward of the leading edge 6 of said wing.

Part of the wing 5 extending from the vertical center of the fuselage 1 to one of the tip end areas 9 of said wing and part of said wing extending from said vertical center to the other of the tip end areas 10 behave essentially as separate wings, each having a span essentially extending from the corresponding side 2 and 3, respectively, of said fuselage and each having an aspect ratio considerably smaller than the aspect ratio of said wing as a whole. The reduction in the aspect ratio greatly increases the angle of attack attainable without separation during the movement of the wing 5 from its forward flight position.

The aircraft has a center of gravity 18 and the wing 5 is forward swept, as seen in FIGS. 1 and 3, in a manner whereby the end tip areas 9 and 10 are above said center of gravity when said wing is in, or close to, its hover position, as shown in FIG. 3. The wing 5 is also a cathedral structure, sloping down as it extends from the fuselage 1, as shown in FIG. 3.

The aircraft has airload centers 19 and 20 and a rudder 21 and the wing tip area 9 is pivotally mounted for rotation about an axis passing through the airload center 19. The wing tip area 10 is pivotally mounted for rotation about an axis passing through the airload center 20. Thus, angular deflection of the wing tip areas 9 and 10 in the slipstream of the propellers 16 and 17, respectively, produces fore and aft forces above the center of gravity 18 thereby producing pitch control moments of said wing tip areas. Differential deflection of the wing tip areas 9 and 10 in the slipstream of the propellers 16 and 17, respectively, where one of said wing tips is up and the other is down, produces yaw control moments at angles when the wing 5 is in and close to its hover position, shown by broken lines in FIG. 1 and by solid lines in FIGS. 2 and 3, and at low speeds, and also produces roll control at angles when said wing is in and close to its forward flight position, shown by solid lines in FIG. 1 and by broken lines in FIG. 3, and at higher speeds, wherein the rudder 21 effectuates yaw control.

The tilt wing VTOL aircraft of the invention is a greatly improved and novel embodiment of the tilt wing VTOL aircraft described and claimed in U.S. Pat. No. 5,141,176. More particularly, as shown in FIGS. 1 to 4, the aircraft of the invention has a pair of flaps 25 and 26 at the trailing edge 7 of the wing 5 for providing direct horizontal motion control for said aircraft.

Each of the flaps 25 and 26 is spaced substantially the same distance from the fuselage 1 and each of the aircraft engines 14 and 15. Thus, the flap 25 is spaced substantially the same distance from the fuselage 1 and the aircraft engines 14 and 15 as the flap 26 is.

As shown in FIG. 4, each flap 25 and 26 is mounted for selective movement from substantial colinearity with the chord 27 of the wing 5 to a first angle A of substantially +30° with said chord and substantially 30° with the upper surface 11 of said wing. Each flap 25 and 26 also is mounted the selective movement from substantial colinearity with said chord to a second angle B of substantially −30° with said chord and substantially 30° with the lower surface 12 of said wing.

When the flaps 25 and 26 are between a small angle with the chord 27 of the wing 5 and the first angle A with said chord (FIG. 4), the aircraft moves in a forward direction 28 while in hover (FIGS. 2 and 4). When the flaps 25 and 26 ate between a small angle with the chord 27 and the second angle B with said chord (FIG. 4), the aircraft moves in a reverse direction 29 while in hover (FIGS. 2 and 4). The acceleration of the aircraft in forward or reverse direction while in hover reaches a magnitude of substantially ±0.1 G.

The horizontal motion forces are produced by the propeller slipstream acting on the wing flaps 25 and 26 and because the flap aerodynamic center of pressure CP is at essentially the same height as the aircraft center of gravity CG (FIG. 3).

The method of the invention comprises the step of mounting the flaps 25 and 26 at the trailing edge 7 of the wing 5 for selective movement from substantial colinearity with the chord 27 of said wing to the first angle A with said chord and the upper surface 11 of said wing and to the second angle B, substantially equal to said first angle, with said chord and the lower surface 12 of said wing. The angles A and B equal approximately 30°. In accordance with the method of the invention, when the flaps 25 and 26 are positioned between a substantially small angle, near zero, with the chord and the first angle A with said chord, the aircraft moves in the forward horizontal direction 28 while in hover. When the flaps 25 and 26 am positioned between a substantially small angle, near zero, with the chord, in accordance with the method of the invention, and the second angle B with said chord, the aircraft moves in the reverse horizontal direction 29 while in hover.

Differential deflection of the flaps 25 and 26 could be used to augment yaw control in hover and roll control in cruise. Furthermore, the flaps 25 and 26 enhance short takeoffs when the aircraft is overloaded and takeoffs in the rolling STOL mode.

Although shown and described in what is believed to be the most practical and preferred embodiment, it is apparent that departures from the specific method and design described and shown will suggest themselves to those skilled in the art and may be made without departing from the spirit and scope of the invention. I, therefore, do not wish to restrict myself to the particular construction described and illustrated, but desire to avail myself of all modifications that may fall within the scope of the appended claims.

I claim:

1. A tilt wing VTOL aircraft having a fuselage with sides and an upper surface, an upper wing having a leading edge, a trailing edge, a chord, a lower surface and an upper surface, said wing being pivotally mounted on said fuselage for rotation from a cruise flight position in which the upper surface of said wing is substantially flush with the upper surface of said fuselage to a hover position in which said wing is substantially perpendicular to said upper surface of said fuselage and aircraft engines mounted on said wing and extending forward of said leading edge of said wing, said aircraft comprising
    direct horizontal motion control means mounted inboard at the trailing edge of said wing for direct aircraft translation devoid of rotation when said wing is in the hover position.

2. A tilt wing VTOL aircraft as claimed in claim 1, wherein said aircraft has a center of gravity at a determined height and wherein said direct horizontal motion control means comprises flaps at the trailing edge of said wing and said flaps have an aerodynamic center of pressure at essentially the same height as said center of gravity of said aircraft.

3. A tilt wing VTOL aircraft as claimed in claim 1, wherein said direct horizontal motion control means comprises a pair of spaced flaps at the trailing edge of said wing equidistantly spaced from said fuselage.

4. A tilt wing VTOL aircraft as claimed in claim 3, wherein said flaps are located between said fuselage and said aircraft engines and each of said flaps is positioned the same distance from the engine closest to it and the same distance from the engine farthest from it.

5. A tilt wing VTOL aircraft as claimed in claim 4, wherein each of said flaps is mounted for selective movement from substantial colinearity with the chord of said wing to a first angle with said chord and said upper surface of said wing and to a second angle, substantially equal to said first angle, with said chord and said lower surface of said wing.

6. A tilt wing VTOL aircraft as claimed in claim 5, wherein said first angle is substantially +30° with said chord and substantially 30° with said upper surface of said wing and said second angle is substantially −30° with said chord and substantially 30° with said lower surface of said wing.

7. A tilt wing VTOL aircraft as claimed in claim 5, wherein when said flaps are positioned between a substantially small angle with said chord and the first angle with said chord, said aircraft moves in a forward substantially horizontal direction while in hover and when said flaps are positioned between a substantially small angle with said chord and the second angle with said chord, said aircraft moves in a reverse substantially horizontal direction while in hover.

8. A tilt wing VTOL aircraft having a fuselage with sides and an upper surface, an upper wing having a leading edge, a trailing edge, a chord, a lower surface and an upper surface, said wing being pivotally mounted on said fuselage for rotation from a cruise flight position in which the upper surface of said wing is substantially flush with the upper surface of said fuselage to a hover position in which said wing is substantially perpendicular to said upper surface of said fuselage and aircraft engines mounted on said wing, said aircraft comprising.
    a pair of flaps at the trailing edge of said wing each located between said fuselage and an engine and each spaced substantially the same distance from the fuselage and each of said engines, said flaps being mounted for selective movement from substantial colinearity with the chord of said wing to a first angle of substantially +30° with said chord and substantially 30° with said upper surface of said wing and to a second angle of substantially −30° with said chord and substantially 30° with said lower surface of said wing, whereby when said flaps are between a substantially small angle with said chord and the first angle with said chord, said aircraft moves in a forward substantially horizontal direction substantially devoid of rotation while in hover and when said flaps are between a substantially small angle with said chord and the second angle with said chord, said aircraft moves in a reverse substantially horizontal direction substantially devoid of rotation while in hover.

9. A tilt wing VTOL aircraft as claimed in claim 8, wherein said aircraft engines constitute at least two engines driving propellers.

10. A method of selectively moving a tilt wing VTOL aircraft in forward and reverse directions when the aircraft is in hover, said aircraft having a center of gravity at a determined height, a fuselage with sides and an upper surface, an upper wing having a leading edge, a trailing edge, a chord, a lower surface and an upper surface, said wing being pivotally mounted on said fuselage for rotation from a cruise flight position on which the upper surface of said wing is substantially flush with the upper surface of said fuselage to a hover position in which said wing is substantially perpendicular to said upper surface of said fuselage and aircraft engines mounted on said wing, said method comprising the step of
    mounting a pair of flaps at the trailing edge of said wing with a flap aerodynamic center of pressure at essentially the same height as said center of gravity of said aircraft and said flaps being further mounted between said fuselage and said aircraft engines.

11. A method of selectively moving a tilt wing VTOL aircraft in forward and reverse directions when the aircraft is in hover, said aircraft having a center of gravity at a determined height, a fuselage with sides and an upper surface, an upper wing having a leading edge, a trailing edge, a chord, a lower surface and an upper surface, said wing being pivotally mounted on said fuselage for rotation from a cruise flight position in which the upper surface of said wing is substantially flush with the upper surface of said fuselage to a hover position in which said wing is substantially perpendicular to said upper surface of said fuselage and aircraft engines mounted on said wing, said method comprising the steps of mounting a pair of flaps at the trailing edge of said wing with a flap aerodynamic center of pressure at essentially the same height as said center of gravity of said aircraft; and mounting the flaps inboard on said wing for selective movement from substantial colinearity with the chord of said wing to a first angle with said chord and said upper surface of said wing and to a second angle, substantially equal to said first angle, with said chord and said lower surface of said wing, wherein when said flaps are positioned between a substantially small angle with said chord and the first angle with said chord, said aircraft moves in a forward substantially horizontal direction substantially devoid of rotation while in hover and when said flaps are positioned between a substantially small angle with said chord and the second angle with said chord, said aircraft moves in a reverse substantially horizontal direction substantially devoid of rotation while in hover.

12. A method as claimed in claim 11, wherein said first angle is substantially $+30°$ with said chord and substantially 30° with said upper surface of said wing and said second angle is substantially $-30°$ with said chord and substantially 30° with said lower surface of said wing.

* * * * *